(12) United States Patent
Zusman (10) Patent No.: US 9,841,316 B2
(45) Date of Patent: Dec. 12, 2017

(54) PIEZOELECTRIC VIBRATION SENSOR FOR MONITORING MACHINERY

(71) Applicant: ViCont, Inc., Houston, TX (US)

(72) Inventor: George V. Zusman, Houston, TX (US)

(73) Assignee: Vicont, Inc., Houston, TX (US)

( * ) Notice: Subject to any disclaimer, the term of this patent is extended or adjusted under 35 U.S.C. 154(b) by 163 days.

(21) Appl. No.: 14/504,137

(22) Filed: Oct. 1, 2014

(65) Prior Publication Data

US 2016/0097674 A1   Apr. 7, 2016

(51) Int. Cl.
G01H 11/08   (2006.01)

(52) U.S. Cl.
CPC .................... G01H 11/08 (2013.01)

(58) Field of Classification Search
CPC ........................................ G01H 11/08
USPC ............................................. 73/658
See application file for complete search history.

(56) References Cited

U.S. PATENT DOCUMENTS

| | | | | | |
|---|---|---|---|---|---|
| 2,286,437 | A | * | 6/1942 | Odell | H03H 3/04 310/315 |
| 4,156,156 | A | * | 5/1979 | Sweany | G10K 9/122 29/25.35 |
| 4,467,236 | A | * | 8/1984 | Kolm | H01L 41/1138 310/321 |
| 4,630,465 | A | * | 12/1986 | Hatton | G01L 23/221 310/324 |
| 4,658,650 | A | * | 4/1987 | Yorinaga | G01H 11/08 310/317 |
| 4,660,410 | A | * | 4/1987 | Asano | G01L 23/222 310/329 |
| 4,727,279 | A | * | 2/1988 | Peng | G01H 11/08 73/35 |
| 5,063,782 | A | * | 11/1991 | Kellett | G01P 15/0922 310/329 |
| 5,218,870 | A | * | 6/1993 | Komurasaki | G01H 11/08 310/329 |
| 5,572,169 | A | * | 11/1996 | Iwamoto | H03L 1/028 331/1 R |
| 5,736,911 | A | * | 4/1998 | Watanabe | H03H 3/04 310/312 |
| 5,939,616 | A | * | 8/1999 | Ito | G01L 23/222 73/35.11 |
| 6,112,577 | A | * | 9/2000 | Kawajiri | G01L 23/222 73/35.11 |

(Continued)

FOREIGN PATENT DOCUMENTS

JP   63195573 A * 8/1988 ............. G01H 11/08

*Primary Examiner* — Laura Martin
*Assistant Examiner* — Jean Morello
(74) *Attorney, Agent, or Firm* — Walter W. Duft (57) ABSTRACT

A vibration sensor includes a piezoelectric crystal; and a base having an upper surface and a lower surface, the piezoelectric crystal attached to the upper surface of the base, the base defining a notch in at least one of the upper surface and the lower surface. Another embodiment of a vibration sensor includes a first piezoelectric crystal; a second piezoelectric crystal; a base attached to the first piezoelectric crystal on first side of the base and attached to the second piezoelectric crystal on a second side of the base opposite the first side of the base; a voltage amplifier in electrical communication to the first piezoelectric crystal; and a charge amplifier in electrical communication to the second piezoelectric crystal.

16 Claims, 9 Drawing Sheets

(56) References Cited

U.S. PATENT DOCUMENTS

2013/0257224 A1* 10/2013 Wodnicki ............. B06B 1/0622
                                                              310/319

* cited by examiner

PIEZOELECTRIC VIBRATION SENSOR FOR MONITORING MACHINERY

TECHNICAL FIELD

This disclosure relates to vibration sensors. More specifically, this disclosure relates to piezoelectric vibration sensors for monitoring machinery.

BACKGROUND

Vibration sensors detect free vibrations. In particular, piezoelectric vibration sensors typically include a piezoelectric crystal that generates a current when the crystal is bent during vibrations. The piezoelectric crystal is typically attached to a base of the vibration sensor and another piezoelectric crystal may be attached to the base such that the base is between the two piezoelectric crystals. The current from the one or two piezoelectric crystals during vibration can then be detected to sense vibrations. Machines or machine systems, such as pumps or compressors, occasionally vibrate excessively when a harmful mechanical condition is present. A vibration sensor can detect these vibrations to signal when the machine system should be inspected or serviced for a harmful mechanical condition. These harmful mechanical conditions may be conditions such as machinery failure, unbalance, misalignment, bearing faults, etc. Vibration sensors can be attached to the machine itself or to fittings or other components of the machine system. Different systems in various conditions and situations may produce different vibrations in different frequency ranges, requiring vibration sensors attached to the system to be calibrated to respond appropriately during a desired frequency range that would indicate a harmful mechanical condition for a particular machine system in a particular situation. Therefore the vibration sensor requires a specific resonance frequency that is specifically tailored to fall within the frequency range of the mechanical condition of the specific machine to which the vibration sensor is attached to.

SUMMARY

Disclosed is a vibration sensor including a piezoelectric crystal; and a base having an upper surface and a lower surface, the piezoelectric crystal attached to the upper surface of the base, the base defining a notch in at least one of the upper surface and the lower surface.

Also disclosed is a method of manufacturing a vibration sensor including cutting a notch into at least one of an upper surface and a lower surface of a base of the vibration sensor; and attaching a piezoelectric crystal to at least one of the upper surface and the lower surface of the base.

Also disclosed is a vibration sensor including a first piezoelectric crystal; a second piezoelectric crystal; a base attached to the first piezoelectric crystal on first side of the base and attached to the second piezoelectric crystal on a second side of the base opposite the first side of the base; a voltage amplifier in electrical communication to the first piezoelectric crystal; and a charge amplifier in electrical communication to the second piezoelectric crystal.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a vibration sensor and associated methods, systems, devices, and various apparatus. In various embodiments, the vibration sensor includes a piezoelectric crystal and a base having an upper surface and lower surface such that the base defines a notch in at least one of the upper surface and the lower surface. The term "base" should be interpreted broadly and should be applied to any member that provides a substrate for deposition of other components. The term "notch" should be interpreted broadly and should be applied to any indention, incision, cut, etc. It would be understood by one of skill in the art that the disclosed vibration sensor is described in but a few exemplary embodiments among many. No particular terminology or description should be considered limiting on the disclosure or the scope of any claims issuing therefrom.

Figure 1:
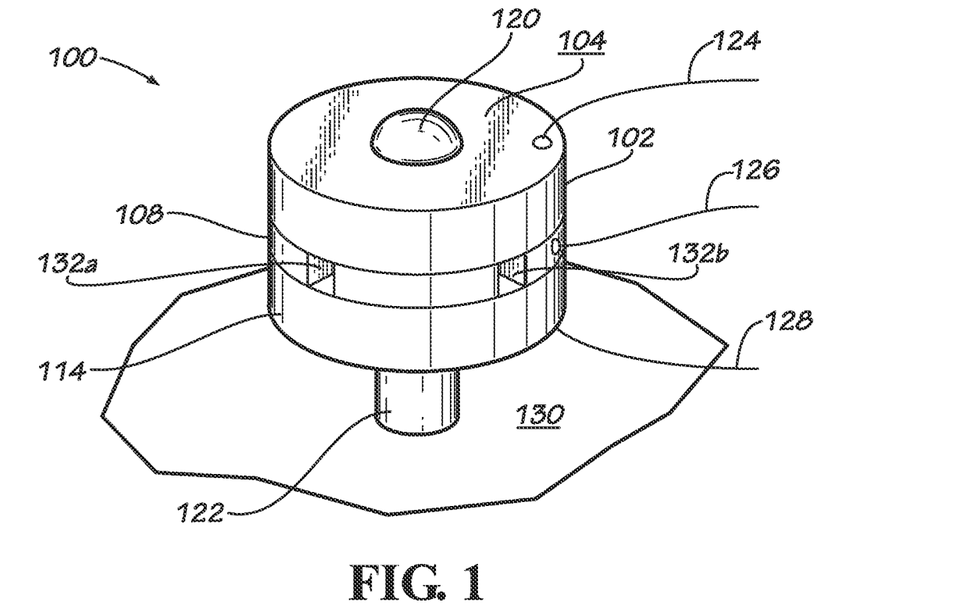
FIG. 1 is a perspective view of a vibration sensor in accordance with one embodiment of the current disclosure.

One embodiment of a vibration sensor 100 is shown in FIG. 1. The vibration sensor 100 comprises a first piezoelectric crystal 102, a base 108, and a second piezoelectric crystal 114. In the current embodiment, the first piezoelectric crystal 102 and second piezoelectric crystal 114 are discs formed from piezoelectric crystals which are highly responsive to alterations and generate an electric current in response to bending or flexing. In the current embodiment, the piezoelectric crystals 102,302 generate a current in response to a vibration.

As shown in FIG. 1, in the current embodiment, the first piezoelectric crystal 102 includes an upper surface 104, a lower surface 106 (shown in FIG. 3), and a fastener hole 310 extending from the upper surface 104 to the lower surface 106 and centered on the upper surface 104 and the lower surface 106 in the current embodiment. The second piezoelectric crystal 114 comprises an upper surface 116 (shown in FIG. 3), a lower surface 118 (shown in FIG. 2), and a fastener hole 312 extending from the upper surface 116 to the lower surface 118 and centered on the upper surface 116 and the lower surface 118 in the current embodiment. The first piezoelectric crystal 102 and second piezoelectric crystal 114 also have a radius $R_P$ (shown in FIG. 2) and a diameter $D_P$ (not shown), which is twice the radius $R_P$. In the current embodiment, diameter $D_P$ is 0.670" and $R_P$ 0.335", though other diameters $D_P$ and radii $R_P$ may be present in various embodiments and the disclosed dimensions should not be considered limiting on the current disclosure. In various embodiments, diameter $D_P$ of the first piezoelectric crystal 102 may be different than the diameter $D_P$ of second piezoelectric crystal 114. The first piezoelectric crystal 102 and second piezoelectric crystal 114 each also have a thickness of 0.025" in the current embodiment, though other thicknesses may be present in various embodiments and the disclosed dimensions should not be considered limiting on the current disclosure. In various embodiments, both the first piezoelectric crystal 102 and second piezoelectric crystal 114 are disc-shaped; however, other shapes may be present in various other embodiments.

As shown in FIG. 1, in the current embodiment, the base 108 is a substrate for deposition of other components of the vibration sensor 100. In various embodiments, the first piezoelectric crystal 102 and second piezoelectric crystal 114 are bonded to the base 108. In this embodiment, a conductive adhesive may be used to bond the first piezoelectric crystal 102 and second piezoelectric crystal 114 to the base 108. This adhesive allows for conductivity and flexibility. In various embodiments, a silver conductive epoxy adhesive may be the adhesive. In various embodiments, the 8330S Silver Conductive Epoxy Adhesive: Slow Cure/Extreme Conductivity epoxy sold by MG Chemicals® may be used as an adhesive. In various other embodiments, the piezoelectric crystals 102,114 may be bonded or attached to the base 108 through other suitable means such as double-sided tape, various glues, various coatings including elastomeric and silicon coatings among others, pure adhesives, or by a fastener such as bolt 120 described below.

Figure 3:
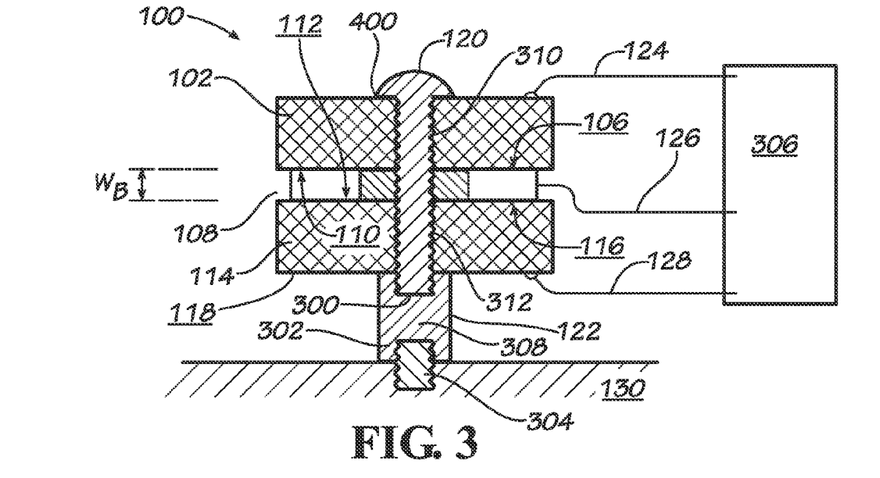
FIG. 3 is a cross sectional view of the vibration sensor shown in FIG. 1 taken along line 3-3 in FIG. 2, showing the vibration sensor connected to an electrical assembly.
Figure 4:
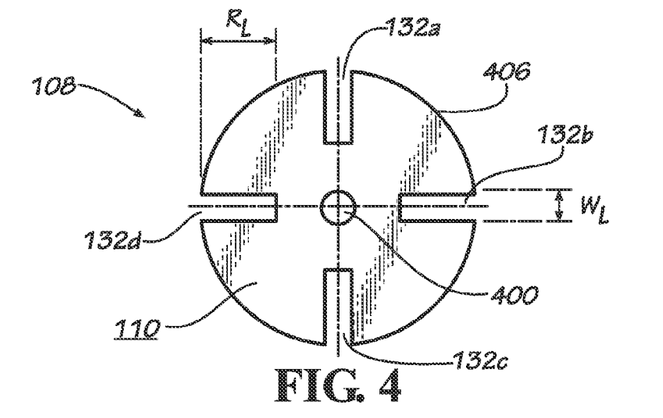
FIG. 4 is a top view of a base of the vibration sensor shown in FIG. 1.

As shown in FIGS. 3 and 4, in various embodiments the base 108 may be a disc and may be made of brass; however, various materials and shapes may be used in various other embodiments. In various embodiments, the base 108 has an upper surface 110, a lower surface 112, and a fastener hole 400. In the current embodiment, the base 108 may also have a thickness $W_B$. In various embodiments, the base 108 may also include N central symmetrical notches 132. In the current embodiment, the notches 132 are defined in the base 108 between the first piezoelectric crystal 102 and the second piezoelectric crystal 114 radially inward from radially outermost edges of the first piezoelectric crystal 102 and the second piezoelectric crystal 114. In various embodiments, the notches 132 may be cut into the base 108 with a laser; however, in various other embodiments, the notches 132 may be cut into the base through another method. In various embodiments such as the present embodiment, N=4 and the base 108 has four notches 132a,b,c,d that are cuts that extend radially inward from a base edge 406. In these embodiments, the notches 132 may extend through the entire thickness $W_B$ of the base 108 from the upper surface 110 to the lower surface 112. In these embodiments, the thickness of the notches 132 equals $W_B$.

In various other embodiments, the notches 132 are cuts that extend radially inward from the base edge on the upper surface 110. In various other embodiments, the notches 132 extend radially inward from the base edge 406 on the lower surface 112. In various embodiments, the notches 132 may extend through a part of the thickness $W_B$ of the base 108 from the upper surface 110 and lower surface 112. In these embodiments, the thickness of the notches 132 is less than $W_B$. Although N=4 in the present embodiment, N may be any suitable number such as 1, 2, 3, 4, 5, 6, 7, or 8. In various other embodiments, N may be any desired number of notches. Additionally, in various embodiments, the notches 132 may be spaced equally around the base 108 such that the angles between notches 132 may be 120°, 90°, 72°, 60°, or 45°; however any desired angle between notches 132 may be employed. Furthermore, in various embodiments, the notches 132 may be spaced asymmetrically around the base 108.

In various other embodiments, the notches 132 may not extend radially inward from the base edge 406. In some of these embodiments, the notches may be punches in the base 108 at some position other than the edge 406. In various embodiments, these punches may extend through the entire thickness $W_B$ of the base 108 or extend partially through the base 108 from the upper surface 110 or lower surface 112. In various other embodiments, the notches may be grooves in the upper surface 110 or lower surface 112 that may extend through the entire thickness $W_B$ of the base 108 or extend partially through the base 108 from the upper surface 110 or lower surface 112. In various embodiments, these grooves may extend in a radial direction, axial direction, or any desired direction. In various other embodiments, the notches 132 may have any desired shape or configuration.

As shown in FIG. 4, in various embodiments, the notches 132 may have a length $R_L$ such that $R_L < R_P$. In the current embodiment, length $R_L$ is 0.170", though other lengths $R_L$ may be present in various embodiments and the disclosed dimensions should not be considered limiting on the current disclosure. The notches 132 also may define a width $W_L$. In various embodiments, the width $W_L$ may be small and depend on manufacturing technology. In the current embodiment, width $W_L$ is 0.044", though other widths $W_L$ may be present in various embodiments and the disclosed dimensions should not be considered limiting on the current disclosure. As will be discussed below, in various embodiment, notches 132 may only slightly change the mass but may provide greater control over the stiffness and flexibility of the base 108 and thereby the sensor 100. In various embodiments, these notches 132 allow for regulation of sensitivity and resonance frequency of the vibration sensor 100 as required for particular sensor applications.

Although two piezoelectric crystals 102,114 and a base 108 are shown in the present embodiment, in various embodiments any number of piezoelectric crystals or bases may be used. In various embodiments, the vibration sensor 100 may only comprise a first piezoelectric crystal 102 and a base 108. In various other embodiments, more than two piezoelectric crystals or more than a single base may be used. In various other embodiments with more than two piezoelectric crystals and more than one base, a series of piezoelectric crystal and base combinations may be in a stacked arrangement aligned on one bolt 120. In this arrangement, the crystal/base combinations may be connected together using an adhesive. In various other embodiments, the adhesive may be double-sided tape, various glues, various coatings including elastomeric and silicon coatings among others, pure adhesives, or by a fastener such as bolt 120. In various other embodiments, an adhesive may not be included. In various embodiments, a non-conducting spacer may be used, such as a nylon or rubber spacer. In various embodiments, a fastener such as bolt 120 may be used. In various other embodiments, conduction may not be a concern if each base was connected to the same ground. This stacked arrangement may have a different response from other orientations. Various other orientations may be used as well.

As shown in FIGS. 1 and 3, in various embodiments the vibration sensor 100 may also include a spacer 122. In various embodiments, the spacer 122 may be made of an insulator. More specifically, in various embodiments, the spacer 122 may made of fiberglass. In the current embodiment, the spacer 122 is made from fiberglass G-10; however, in various other embodiments, any suitable insulator material may be used to make the spacer 122. In various embodiments, the spacer 122 may have a cylindrical shape. In various embodiments, the spacer 122 may also define a first bore 300 and a second bore 302. In various other embodiments, the spacer 122 may define only a first bore 300 or second bore 302. Additionally, in various other embodiments, the spacer 122 may have a shape other than cylindrical shape. In the current embodiment, the first bore 300 and second bore 302 are separated from each other by a solid portion 308 of the spacer 122. In various other embodiments, the first bore 300 and second bore 302 may form a continuous hole through the spacer 122. In the current embodiment, the first bore 300 and second bore 302 are threaded openings for mating with a bolt, screw, or other threaded securing device. In the present embodiment, the vibration sensor may also include the bolt 120 and attachment screw 304. In various embodiments, the bolt 120 may secure the base 108 and piezoelectric crystals 102,114 to the spacer 122. The attachment screw 304 may secure the vibration sensor 100 to a machine 130. However, in various other embodiments, another securing mechanism may be employed to secure the vibration sensor 100 together and to the machine 130. In other embodiments, a variety of fasteners may be used and would be understood by one of skill in the art, including gluing, welding, sealing with a sealant, or providing mating threading on the machine 130 or spacer 122, among other solutions.

As stated elsewhere in this disclosure, in various embodiments, the piezoelectric material produces electrical charge in response to bending or flexing, and a waveform of charge may be produced when the piezoelectric material is exposed to vibration. As such, a charge differential between the first piezoelectric crystal 102, base 108, or second piezoelectric crystal 114 upon bending or flexing of the piezoelectric material may be used to sense the characteristics of vibrations, such as frequency or amplitude of the vibration, to which the vibration sensor 100 has been exposed.

Figure 2:
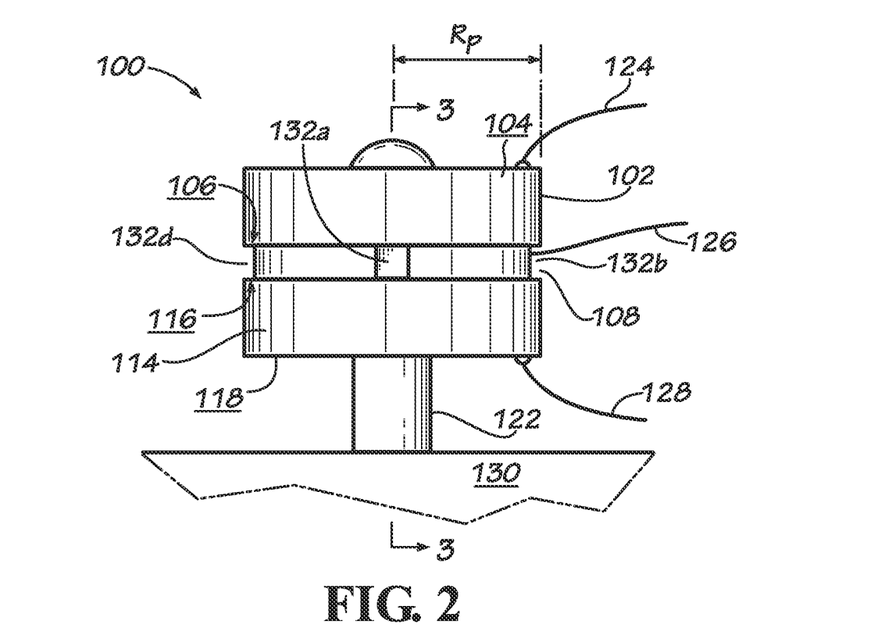
FIG. 2 is a side view of the vibration sensor shown in FIG. 1

As shown in FIGS. 1, 2, and 3, in various embodiments, the vibration sensor 100 may include a first wire 124, a second wire 126, and a third wire 128. In the current embodiment, the first wire 124 may be electrically connected to the first piezoelectric crystal 102, the second wire 126 may be electrically connected to the base 108, and the third wire 128 may be electrically connected to the second piezoelectric crystal 114. In various other embodiments, the first wire 124, second wire 126, and third wire 128 may be connected to the piezoelectric crystals 102,114 and base 108 by any preferred attachment mechanism. For example, in various embodiments, the wires 124,126,128 may be connected to the vibration sensor 100 at various locations with an adhesive. In various other embodiments, the wires 124, 126,128 may be soldered to the first piezoelectric crystal 102, base 108, and second piezoelectric crystal 114, respectively. In various other embodiments, the first wire 124, second wire 126, or third wire 128 may be connected directly to the first piezoelectric crystal 102, the second piezoelectric crystal 114, the base 108, a washer, a nut, or bolt 120. In various other embodiments, the wires 124,126, 128 may be connected to the vibration sensor 100 at any desired location on the vibration sensor 100. In the current embodiment, the wires 124,126,128 may allow connection to an electrical assembly 306 such that the current produced by the vibration sensor 100 may be handled electronically. In the current embodiment, this may include recordation, amplification, summation, digital processing, and a number of other electrical features, described below in this disclosure. In various other embodiments, the wires may allow connection to another electrical device such as a processing device.

Figure 10:
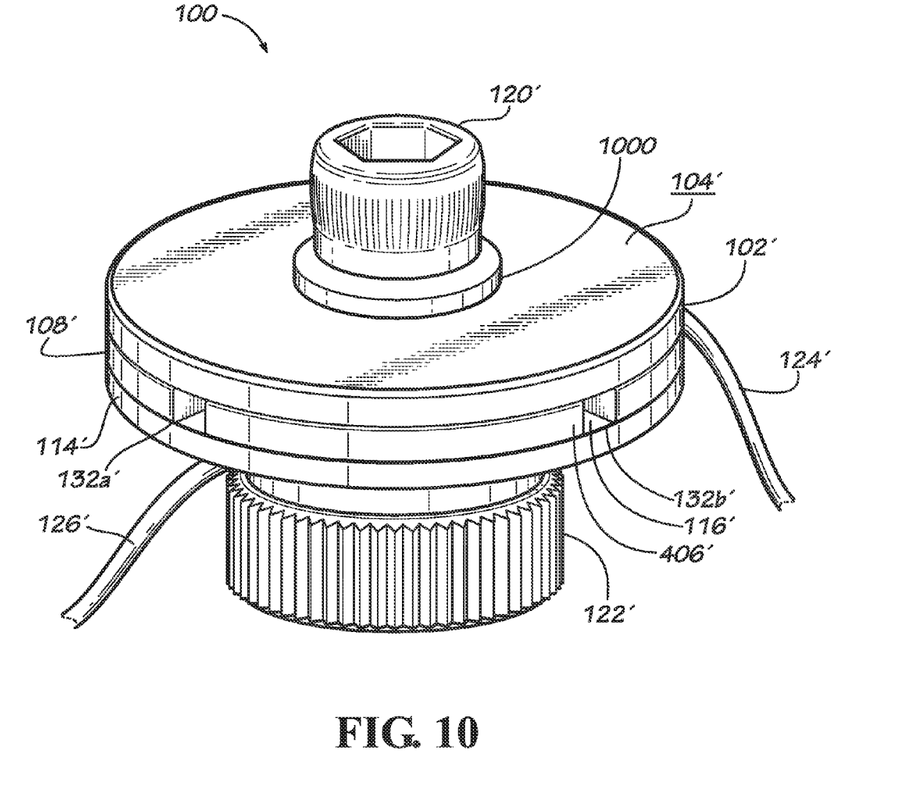
FIG. 10 is a top perspective view of a vibration sensor in accordance with another embodiment of the current disclosure.
Figure 11:
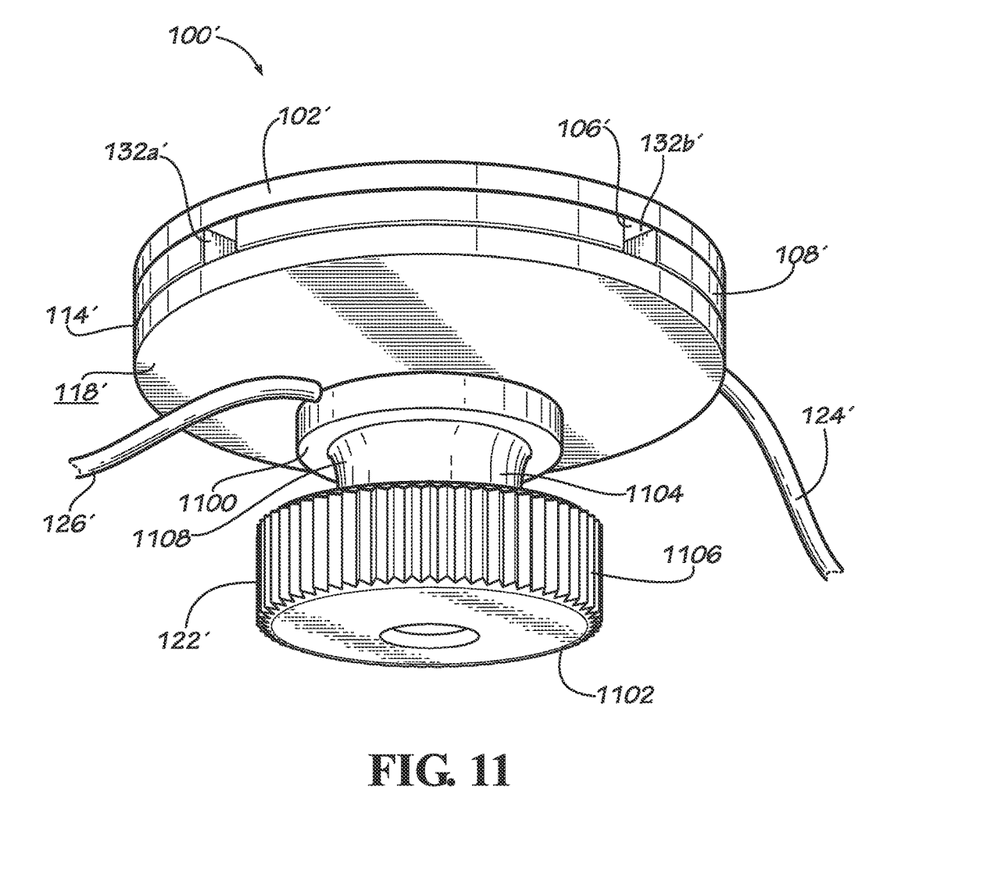
FIG. 11 is a bottom perspective view of the vibration sensor shown in FIG. 10.

As shown in FIGS. 10 and 11, in various other embodiments, a vibration sensor 100' may include only two wires 124', 126' instead of three wires 124,126,128. In these embodiments, the components of the vibration sensor 100' may be substantially similar to the components of vibration sensor 100. In various embodiments, the vibration sensor 100' may include a first piezoelectric crystal 102', a base 108', and a second piezoelectric crystal 114'. The first piezoelectric crystal 102' may include an upper surface 104' and a lower surface 106'. The base 108' may include an upper surface and a lower surface. The base 108' may also include notches 132' extending radially inward from an outer edge 406' of the base 108'. The second piezoelectric crystal 114' may include an upper surface 116' and a lower surface 118'. In various embodiments, the vibration sensor 100' may also include a spacer 122'. In various embodiments, the spacer 122' may have a cylindrical lower portion 1102 with jagged edge sides 1106 on the lower portion 1102. The spacer 122' may also have a cylindrical upper portion 1104 with curved sides 1108. In the present embodiment, the curved sides 1108 may have a concave curve. In these various other embodiments, a first wire 124' may be connected to the first piezoelectric crystal 102' and a second wire 126' may be connected to the base 108'. In various other embodiments, the first wire 124' may be connected to the first piezoelectric crystal 102' and the second wire 126' may be connected to the second piezoelectric crystal 114'. In various other embodiments other configurations may be present.

As shown in FIGS. 10 and 11, in various embodiments, the vibration sensor 100' may further comprise a first washer 1000 or a second washer 1100. In various embodiments, the first washer 1000 may be positioned between the head of a bolt 120' and the upper surface 104' of the first piezoelectric crystal 102'. The second washer 1100 may be positioned between the spacer 122' and the lower surface 118' of the second piezoelectric crystal 114'. In various embodiments, the washer may be made of nylon or other nonconductive material to avoid contact of a metal bolt 120' with electrical circuitry. In various other embodiments, the washer may be a metal washer or made of conductive material. In some of these various other embodiments, the wires may be soldered or attached to the washer. The bolt 120' may be made of nonconductive material. In various embodiments, an additional washer may be placed between the vibration sensor 100' and an outer housing, described below, to prevent contact with electrical circuitry. In other embodiments, the first washer 1000 and/or second washer 1100 may have a polishing surface (not shown). The first washer 1000 and/or second washer 1100 may further define a washer diameter $D_W$ (not shown). In the current embodiment, washer width $D_W$ is 0.217", though other washer widths $D_W$ may be present in various embodiments and the disclosed dimensions should not be considered limiting on the current disclosure. In particular, in various embodiments, the ratio of $D_W:D_P$ may be 1:4 or 1:3. At these width ratios, the width $D_W$ of the washer 900 provides the vibration sensor 100 with an optimized strength with maximum sensitivity. In other embodiments for hard vibration applications, the ratio of $D_W:D_P$ may be 1:2.

In various other embodiments not shown, the vibration sensor 100 may not be in direct contact with the machine 130 as shown in FIG. 1. In these various other embodiments, the vibration sensor 100 may be enclosed in an outer casing or housing. In various embodiments, the housing may be made of aluminum to form an aluminum casing. In other embodiments, the housing may be made of steel to form a steel casing. In yet other embodiments, any preferred material may be used to form the outer casing. When an outer housing is included, the outer housing may be attached to the vibration sensor and a pipe through screws, magnets, or any other suitable attachment mechanism. In one set of embodiments, the vibration sensor 100 may include magnets to attach to the outer housing and the outer housing may include magnets to attach to the side of a machine. In other embodiments, screws and/or bolts may be substituted for the magnets.

As described above, in the current embodiment, the notches 132 in the base 108 may not substantially change the mass of the base 108. Although the notches 132 may not substantially change the mass, they may be used to control the stiffness of the base 108 and thereby the stiffness of the sensor 100. In the present embodiment, the notches 132 adjust the stiffness of the mass of the base and allow for regulation of sensitivity and resonance frequency of the vibration sensor as required for particular sensor applications.

The resonance of an item may be defined as the tendency to oscillate or to vibrate with greater amplitude at some frequencies over others. The resonance frequency of an item may be defined as the frequency at which the response amplitude is at a relative maximum. The sensitivity of an item may be defined as the minimum magnitude of an input signal required to produce a specified output signal. Piezoelectric sensor resonance frequency and sensitivity may be defined by the following equations:

$$\text{Resonance Frequency} = K * \left(\frac{\text{Stiffness}}{\text{Mass}}\right)^{1/2}$$

$$\text{Sensitivity} = N * \left(\frac{\text{Mass}}{\text{Stiffness}}\right)$$

where the coefficients K and N are based on the sensitivity of the ceramic material of the piezoelectric crystal and, to a lesser extent, on the construction of the sensor. More specifically, coefficient K is slightly less than $\frac{1}{2}\pi$, depending on the system damper properties. More specifically, $K \approx 0.150$ in various embodiments. Coefficient N directly depends on the sensitivity of the piezoelectric (piezo-module) and sensor construction. In particular, the piezo-module may be defined as a ratio of the charge and force which created that charge at the piezoelectric.

As indicated by the formulas, the sensitivity of the sensor is proportional to mass and inversely proportional to stiffness. The resonance frequency is proportional to stiffness and inversely proportional to mass. In traditional compression and shear mode piezoelectric sensors, it is not typically possible to alter the stiffness of construction of the sensors; instead, typically only the mass and sensitivity of the ceramic material may be altered to provide a suitable sensor. However, these sensors have limited use for machine applications because they are not flexible to achieve the fixed resonance frequency required by specific vibration sensor applications since only mass may be altered.

In various embodiments, the vibration sensor 100 with the notches 132 may allow the parameter of stiffness to be adjusted while limiting the loss of mass, which was not possible with traditional sensors. The ability to adjust the stiffness parameter without substantially changing the mass provides more flexibility to get a required sensitivity. The stiffness of the sensor may be altered by changing the size, shape, depth, or length of the notches 132. The flexibility of being able to change the stiffness allows the possibility of finding an optimal ratio of sensitivity and frequency range for a particular sensor application and provides a reasonable main sensitivity while having very small cross axis sensitivity. Therefore, in various embodiments, the vibration sensor 100 may have a resonance frequency that is tuned to an anticipated frequency of vibrations generated by the machine 130. The resonance frequency may be tuned in some embodiments and may not be tuned in others.

Figure 6:
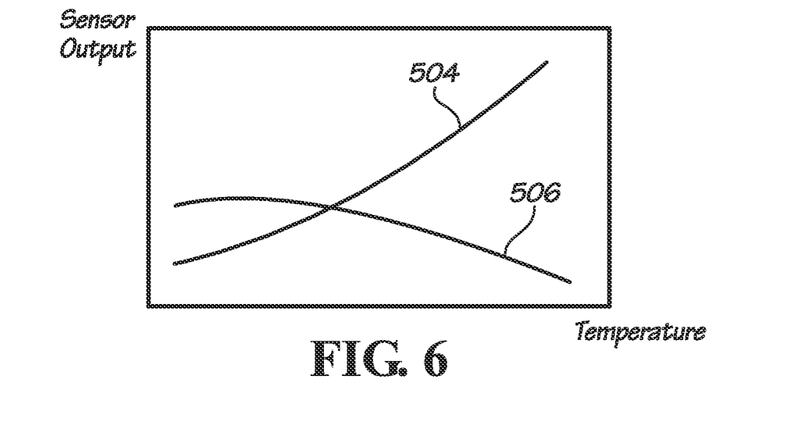
FIG. 6 is a graph illustrating the relationship between a sensor output of a vibration sensor and temperature.
Figure 12:
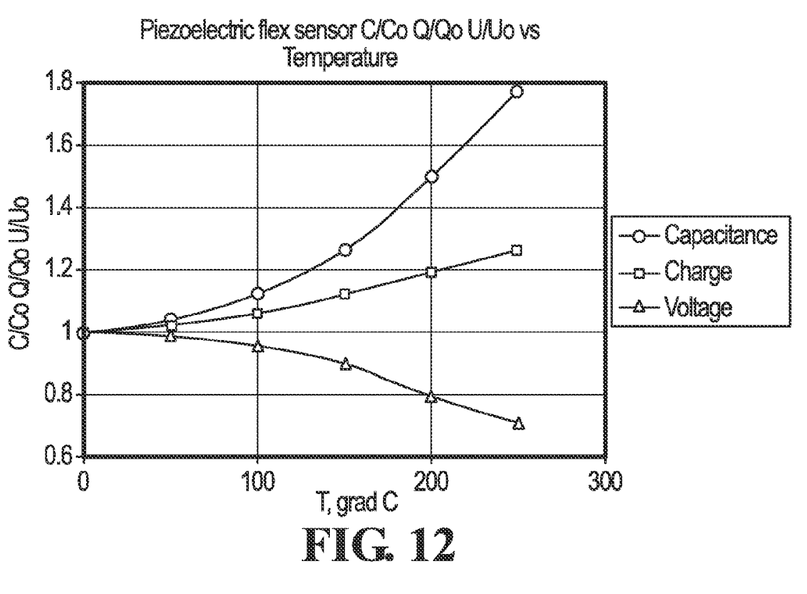
FIG. 12 is a graph showing a capacitance, charge, and voltage output of a vibration sensor as a function of temperature.

As shown in FIGS. 6 and 12, in various embodiments, the vibration signal output from a traditional piezoelectric sensor is heavily dependent on temperature. FIG. 6 shows a general schematic of how the vibration signal as measured by a charge output 504 and a voltage output 506 changes as temperature increases. As shown, as temperature increases, the gain of the charge output 504 increases while the gain of the voltage output 506 decreases. FIG. 12 shows a detailed chart indicating how charge output, capacitance output, and voltage output change at specific temperatures as temperature increases. The dependence of the vibration signal on temperature provides complexity to signal analysis.

As shown in FIG. 3, in various embodiments an electrical assembly 306 may be included to calibrate resonance output for monitoring of the sensor 100. The signals from the vibration sensor 100 are input into the electrical assembly 306 to get the output 512 (shown in FIG. 5). The signals from the vibration sensor 100 may be based on sensor construction, amplitude of the vibration, or frequency. The resonance described is repeatable in terms of amplitude and frequency. As described previously, resonance frequency may be regulated by mass and size of the piezoelectric crystals 102,114 and the number and size of notches 132.

Figure 5:
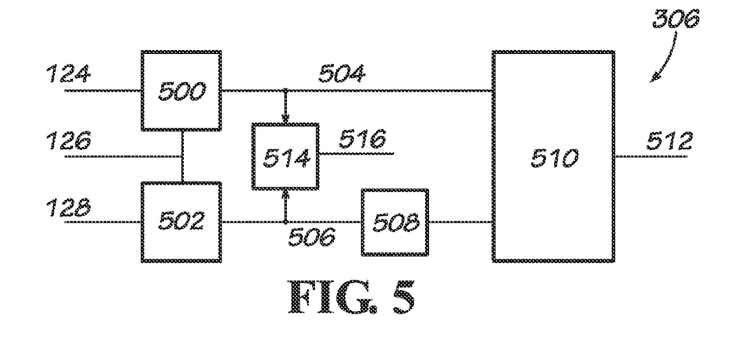
FIG. 5 is a block diagram of one embodiment of an electrical assembly for use with a vibration sensor to receive a vibration output independent from temperature and a temperature output.
Figure 13:
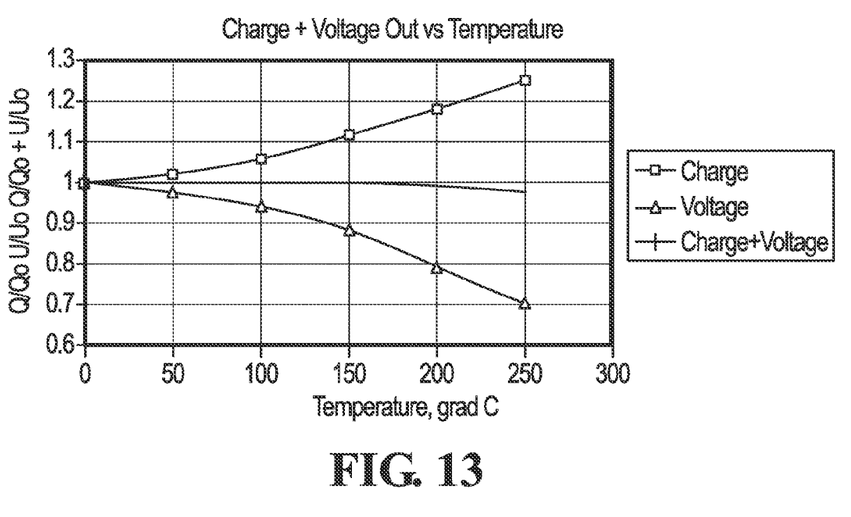
FIG. 13 is a graph showing charge and voltage output of a vibration sensor and a vibration output signal of the electrical assembly shown in FIG. 5 as a function of temperature.
Figure 14:
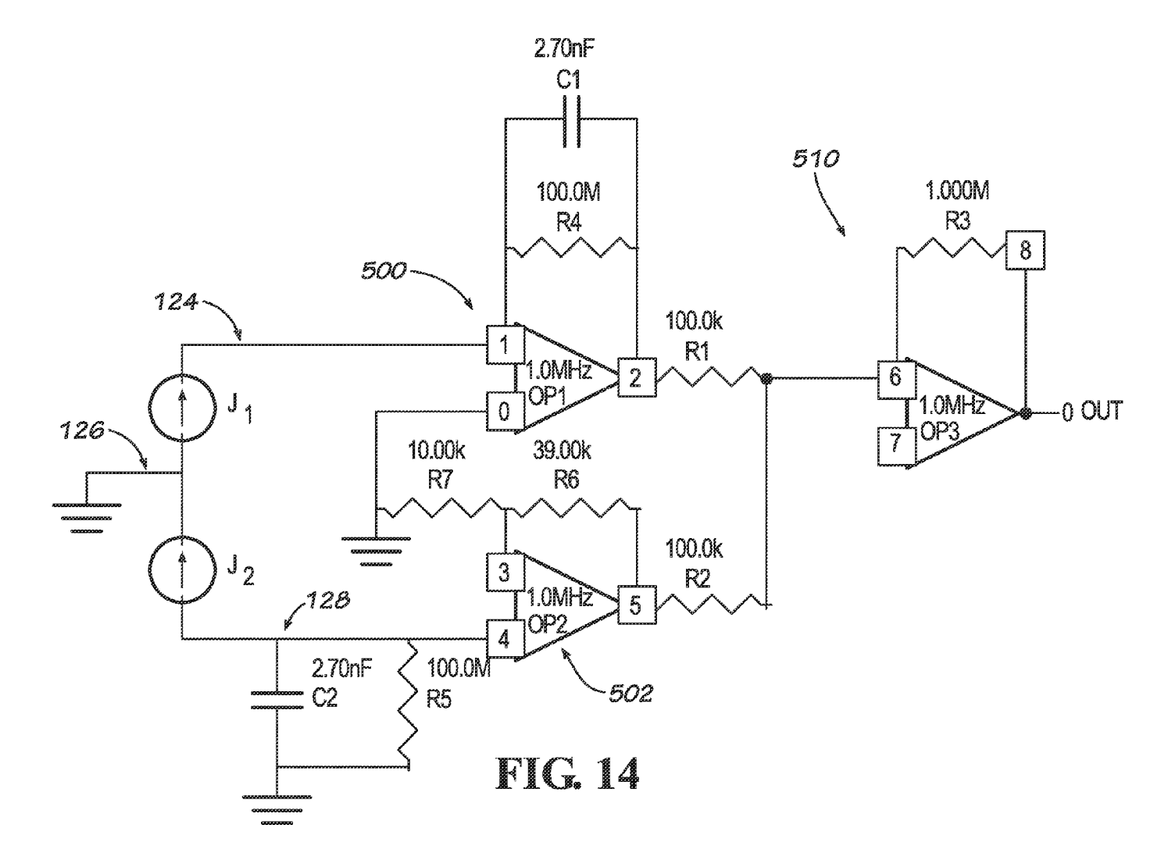
FIG. 14 is a circuit diagram of the electrical assembly shown in FIG. 5.

In various embodiments, the electrical assembly 306 shown in FIG. 3 may include circuitry as shown in FIG. 5 and FIG. 14. In these embodiments, the circuitry may provide a vibration signal output 512 which is independent from temperature. In the current embodiment, the circuitry may include a charge amplifier 500 that receives input from the vibration sensor 100 through the first wire 124 and second wire 126. A voltage amplifier 502 may also be provided that receives input from the vibration sensor 100 through the second wire 126 and third wire 128. The charge output 504 of the charge amplifier 500 may then be received as a first input at a summing circuit 510. The voltage output 506 of the voltage amplifier 502 may be passed through a buffer-amplifier 508 and received as the second input at the summing circuit 510. The summing circuit 510 then may produce a summed vibration signal output 512 based on the input from the charge amplifier 500 and voltage amplifier 502. In various embodiments, the summing circuit 510 may produce the summed vibration signal output 512, which may be a vibration signal less dependent from temperature than traditional circuits. In various embodiments, the output 512 may be 10× less dependent on temperature than traditional circuits. As shown in FIG. 13, the summed vibration signal output 512 (charge+voltage) may provide a more stable vibration signal compared to the charge output or the voltage output respectively, even as temperature increases.

Figure 7:
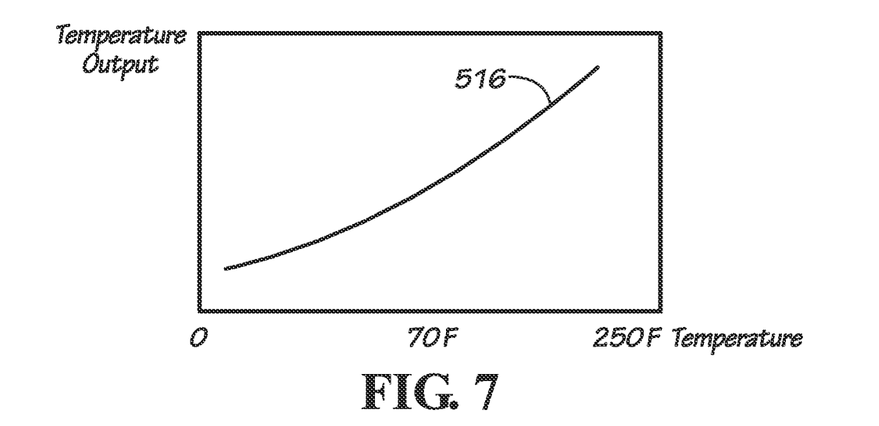
FIG. 7 is a graph illustrating the relationship between a temperature output signal of a vibration sensor and temperature.
Figure 15:
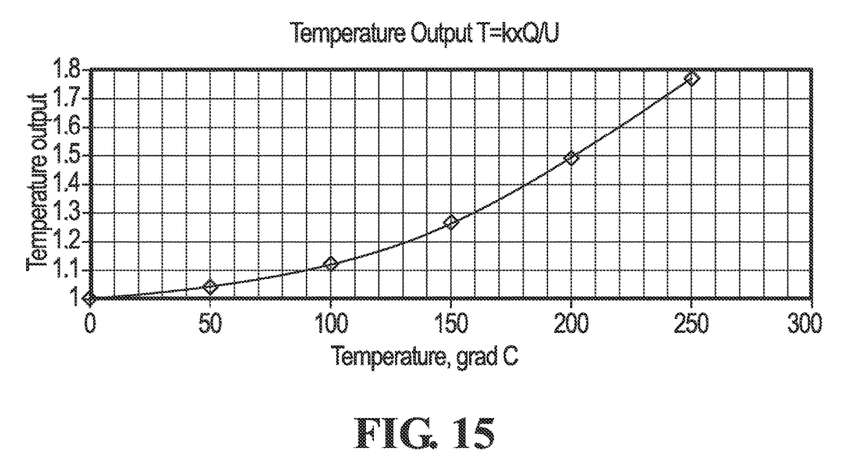
FIG. 15 is a graph showing a temperature output signal of the electrical assembly shown in FIG. 5 as a function of temperature.

As shown in FIG. 5, in various embodiments the circuitry may also produce a temperature output 516 which is independent from vibration. In these embodiments, a divider circuit 514 may be provided to receive charge output 504 and voltage output 506. The temperature output 516 may be a voltage proportional to the temperature and independent of vibration. In one embodiment, the temperature output 516 may be calculated by dividing the voltage proportional to the output 504 coming from the charge amplifier 500 by the voltage proportional to the output 506 coming from the voltage amplifier 502 at divider circuitry 514. As shown in FIGS. 7 and 15, the temperature output 516 increases as temperature increases.

Figure 8:
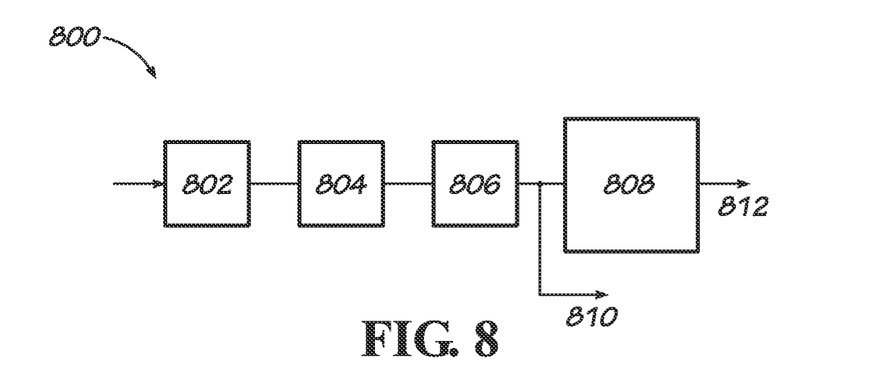
FIG. 8 is a block diagram of a portion of another embodiment of an electrical assembly configured to determine a calibrated resonance.

In various other embodiments, the resonance of the vibration signal may also be regulated. As shown in in FIG. 8, part 800 may be included in the circuitry to provide a calibrated resonance output 810. In various embodiments, the part 800 may include a passive filter 802, a voltage amplifier 804, or a buffer 806 to produce an output 810 calibrated by amplitude resonance. The part 800 also may produce a regular vibration output 814. In various embodiments, the passive filter 802 may provide a frequency output of:

$$\frac{K1}{(1+(J*W*K2)}$$

where J is complex number i (the square root of −1), W is the input frequency, and K1 and K2 are filter coefficients which regulate sensor resonance and are based on the design of the passive filter 802, including the resistance and capacitance properties of the passive filter 802. The frequency output may then be used as an input to a voltage amplifier 804 or charge amplifier to produce an output 810 calibrated by amplitude frequency. A proportional filter 808 may be applied to part of the calibrated output 810 to produce an output 812 with a frequency response of:

$$K5*\frac{1+(J*W*K3)}{1+(J*W*K4)}$$

where K3, K4, and K5 are filter coefficients that are based on the design of the proportional filter 808, including the resistance and capacitance properties of the proportional filter 808. In various embodiments, K2=K3. In this embodiment, this provides a normal vibration output with the frequency response according to the formula:

$$K1*\frac{K5}{1+(J*W*K4)}$$

As will be described below, in various embodiments, calibrated resonance output 810, temperature output 516, or summed vibration output 512 may be used to monitor the sensor 100.

A method of manufacturing and assembly of a vibration sensor 100 is also disclosed. In the various embodiments, the base 108 of the vibration sensor 100 may be formed with a fastener hole 400 and at least one notch 132 extending radially inward from an outer edge 406. In the current embodiment, when the base 108 has been formed, a first piezoelectric crystal 102 and second piezoelectric crystal 114 may be positioned on the base 108. In various embodiments, the piezoelectric crystal 102 may be positioned such that the lower surface 106 of the first piezoelectric crystal 102 is adjacent to the upper surface 110 of the base 108. The piezoelectric crystal 114 may be positioned such that the upper surface 116 of the second piezoelectric crystal 114 is adjacent to the lower surface 112 of the base 108. In the current embodiment, the first piezoelectric crystal 102 and second piezoelectric crystal 114 are attached to the base 108 with an adhesive that allows a current to pass through. In particular, the adhesive allows for conductivity and flexibility in the current embodiment. In one embodiment, a silver conductive epoxy adhesive is the adhesive. In other embodiments, the piezoelectric crystals 102,114 may be bonded or attached to the base 108 through other suitable means such as double-sided tape, various glues, various coatings including elastomeric and silicon coatings among others, pure adhesives, or by a fastener such as bolt 120.

As shown in FIG. 3, in various embodiments, the spacer 122 may be positioned adjacent to the lower surface 118 of the second piezoelectric crystal 114. After the spacer 122 is included, the fastener hole 310 of the first piezoelectric crystal 102, the fastener hole 400 of the base 108, the fastener hole 312 of the second piezoelectric crystal 114, and first bore 300 in the spacer 122 may be aligned. In the current embodiment, the bolt 120 may then be inserted through the aligned openings and into the first bore 300 to secure the vibration sensor 100 together. In various embodiments, the attachment screw 304 may be inserted into the second bore 302 of the spacer 122 and attached to the machine 130. The first wire 124, second wire 126, and third wire 128 may be connected to the first piezoelectric crystal 102, base 108, and second piezoelectric crystal 114, respectively. The wires 124,126,128 may then be connected to the electrical assembly 306.

Figure 9:
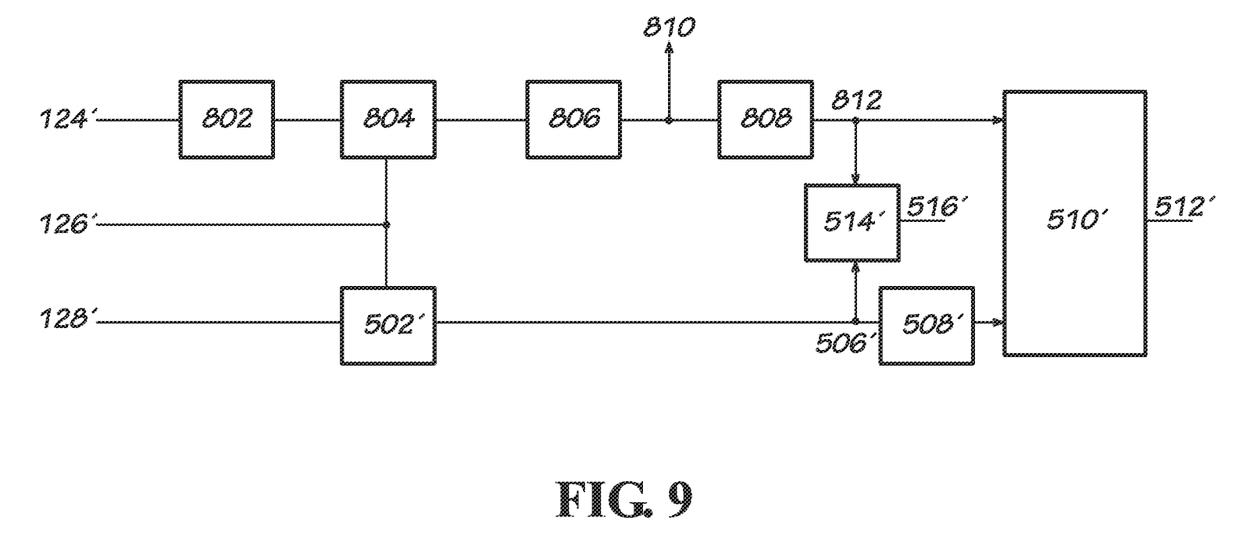
FIG. 9 is another embodiment of an electrical assembly including the portion shown in FIG. 8.

As shown in FIGS. 9 and 10, in various other embodiments, the first washer 1000 may be inserted between the first piezoelectric crystal 102' and bolt 120'. The second washer 1100 may be inserted between the second piezoelectric crystal 114' and spacer 122'. Additionally, in various other embodiments, only two wires may be connected to the vibration sensor 100'. In these various other embodiments, a first wire 124' may be connected to the first piezoelectric crystal 102' and the second wire 126' may be connected to the base 108'. The wires 124', 126' may then be connected to an electrical assembly (not shown).

A method of detecting a vibration with a vibration sensor 100 is also disclosed. In various embodiments, the vibration sensor 100 may be mounted to the machine 130. In one embodiment, the sensor 100 is mounted to a compressor. In various other embodiments, the sensor 100 may be mounted to a pump. In various other embodiments, the sensor 100 may be mounted to other types of machines 130. When the vibration sensor 100 is mounted to the machine 130, the vibration sensor 100 may detect mechanical vibrations in the machine 130 which are typically symptomatic of a harmful mechanical condition. In various embodiments, the sensor 100 may detect vibrations due to harmful mechanical conditions like unbalance, misalignment, and bearing faults. In other embodiments, the sensor may detect vibrations due to any other harmful mechanical conditions. The vibration travels through the machine 130 to the screw 304. In various other embodiments, the translated vibration travels through the machine 130 to a magnet of the sensor 100 connecting the sensor 100 to the machine 130.

In various embodiments, when vibration is translated into the vibration sensor 100, the piezoelectric crystals 102,114 may generate an electronic current. In various embodiments, the current may be transmitted to wires 124,126,128 which may be connected to a circuit board or other processor where the current is processed for the detection of a leak. The detection of a leak may then be communicated to a remotely located processor that includes a leak detection algorithm. In various embodiments, the processor may convert the amplitude of the vibration into a voltage proportional to the vibration. In other embodiments, the processor may convert the amplitude of the vibration into a current proportional to the vibration. In yet other embodiments, the processor may convert the amplitude of the vibration into both a voltage proportional to the vibration and a current proportional to the vibration. After the vibration amplitude is converted to a voltage or current or both, an external logic solver may compare the vibration signal level to a predetermined threshold level. The predetermined threshold level may be used to determine whether a detected vibration is at an acceptable level. In various embodiments, a vibration below the predetermined threshold level may be an acceptable vibration. If the converted amplitude of vibration surpasses or exceeds the predetermined threshold level, the event is marked as an "above threshold event." In various embodiments, the "above threshold event" may cause an alert signal or communication to be sent to a utility provider for further analysis. In various other embodiments, the "above threshold event" may set off an alarm at the utility provider warning of a vibration above the acceptable predetermined threshold level. In practice, this vibration sensor will detect water leaks and allow conservation of water or funds normally lost in water leaks.

In various embodiments, the current may be transmitted to wires 124,126,128 which may be connected to the electrical assembly 306 or 306' which provides the summed vibration signal output 512 independent of temperature, the temperature output 516, or the output 810 calibrated by amplitude resonance. The output 512, output 516, or output 810 may then be communicated to a processor that includes a leak detection algorithm.

In various embodiments, the processor may convert the amplitude of the vibration output 512 into a voltage proportional to the vibration. In other embodiments, the processor may convert the amplitude of the vibration output 512 into a current proportional to the vibration. In yet other embodiments, the processor may convert the amplitude of the vibration output 512 into both a voltage proportional to the vibration and a current proportional to the vibration. After the vibration output 512 amplitude is converted to a voltage or current or both, an external logic solver may compare the vibration signal level to a predetermined threshold level. The predetermined threshold level may be used to determine whether a detected vibration is at an acceptable level. For example, in various embodiments, a vibration below the predetermined threshold level may be an acceptable vibration. If the converted amplitude of vibration surpasses or exceeds the predetermined threshold level, the event is marked as an "above threshold event." In other various embodiments, the external logic solver may determine whether or not the machine should be powered down due to the "above threshold event." In yet other embodiments, the external logic solver may automatically shut down a machine upon determination of an "above threshold event." In other embodiments, the "above threshold event" may cause an alert signal to be sent to an operator for further analysis. In further embodiments, the "above threshold event" may set off an alarm warning of a vibration above the acceptable predetermined threshold level.

In other embodiments, the processor may use the temperature output 516, either alone or in combination with output 512, to monitor the machine. In these embodiments, an external logic solver compares the temperature output level to a predetermined threshold level. The predetermined threshold level is used to determine whether a detected temperature is at an acceptable level. For example, in various embodiments, a temperature below the predetermined threshold level may be an acceptable temperature. If the temperature surpasses or exceeds the predetermined threshold level, the event is marked as an "above threshold event." In one embodiment, the external logic solver may determine whether or not the machine should be powered down due to the "above threshold event." In other embodiments, the "above threshold event" may cause an alert signal to be sent to an operator for further analysis. In further embodiments, the "above threshold event" may set off an alarm warning of a temperature above the acceptable predetermined threshold level.

In other embodiments, the processor may use the calibrated resonance output 810, either alone or in combination with temperature output 516 or output 512, to monitor the machine. In these embodiments, an external logic solver compares the calibrated resonance output level to a predetermined threshold level. The predetermined threshold level is used to determine whether a detected temperature is at an acceptable level. For example, in various embodiments, a calibrated resonance output 810 below the predetermined threshold level may be an acceptable calibrated resonance. If the calibrated resonance output 810 surpasses or exceeds the predetermined threshold level, the event is marked as an "above threshold event." In various embodiments, the external logic solver may determine whether or not the machine should be powered down due to the "above threshold event." In other embodiments, the "above threshold event" may cause an alert signal to be sent to an operator for further analysis. In further embodiments, the "above threshold event" may set off an alarm warning of a calibrated resonance above the acceptable predetermined threshold level.

In practice, the disclosed vibration sensor 100 prevents unnecessary waste caused by speculative preventive maintenance and increases the life cycle of machine components by alerting operators to early stage development of harmful mechanical conditions.

One should note that conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more particular embodiments or that one or more particular embodiments necessarily include logic for deciding, with or without user input or prompting, whether these features, elements or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A vibration sensor comprising:
   a piezoelectric crystal having an outer diameter;
   a base having an upper surface and a lower surface that each extend to a common outer edge of the base defining an outer diameter of the base, the piezoelectric crystal attached to the upper surface of the base, the base defining a notch in at least one of the upper surface or the lower surface, the base outer diameter being smaller than the outer diameter of the piezoelectric crystal;
   wherein the notch is defined on the base so that at least a portion of the notch is inward from the outermost edge of the piezoelectric crystal when the piezoelectric crystal is attached to the base; and
   a fastener extending through a hole defined in the piezoelectric crystal and a hole defined the base;
   a spacer, the fastener attaching the piezoelectric crystal and the base to the spacer;
   wherein the piezoelectric crystal is attached to the base by conductive adhesive.

2. The vibration sensor of claim 1, wherein the notch is a cut extending from the upper surface to the lower surface.

3. The vibration sensor of claim 1, wherein the base is disc-shaped and the notch extends in a radial direction relative to an axis of the base.

4. The vibration sensor of claim 1, wherein the notch is a first notch and the base includes a second notch in at least one of the upper surface or the lower surface.

5. The vibration sensor of claim 4, wherein the base defines a plurality of notches, each notch in at least one of the upper surface or the lower surface.

6. The vibration sensor of claim 1, wherein the piezoelectric crystal is a first piezoelectric crystal, the vibration sensor further comprising a second piezoelectric crystal attached to the lower surface of the base.

7. The vibration sensor of claim 6, further comprising a passive filter in electrical communication with the first piezoelectric crystal; a first amplifier in electrical communication with the second piezoelectric crystal, a second amplifier in electrical communication with the passive filter, and a proportional filter in electrical communication with the second amplifier, the passive filter producing a passive filter output with a first frequency response providing frequency-dependent attenuation according to the relationship K1/(1+jωK2), where K1 and K2 are passive filter coefficients and ω is frequency, and the proportional filter producing a proportional filter output with a second frequency response providing frequency-dependent proportional amplification according to the relationship K5*[(1+jωK3)/(1+jωK4)], where K3, K4 and K5 are proportional filter parameters and ω is frequency.

8. The vibration sensor of claim 7, wherein the first amplifier is a charge amplifier and the second amplifier is a voltage amplifier.

9. The vibration sensor of claim 7, wherein the first amplifier is a voltage amplifier and the second amplifier is a charge amplifier.

10. The vibration sensor of claim 7, further comprising a summing circuit in electrical communication with a voltage amplifier and a charge amplifier.

11. The vibration of claim 1, wherein the base is circular.

12. The vibration sensor of claim 1, wherein the notch extends through only part of the thickness of the base.

13. A method of manufacturing a vibration sensor comprising:
    cutting a notch into at least one of an upper surface or a lower surface of a base of the vibration sensor, the upper surface and the lower surface of the base each extending to a common outer edge of the base that defines an outer diameter of the base;
    bonding a piezoelectric crystal to at least one of the upper surface or the lower surface of the base, the piezoelectric crystal having an outer diameter greater than the outer diameter of the base;
    wherein the notch is defined on the base so that at least a portion of the notch is inward from the outermost edge of the piezoelectric crystal when the piezoelectric crystal is attached to the base; and
    wherein a fastener extends through a hole defined in the piezoelectric crystal and a hole defined the base, the fastener attaching the piezoelectric crystal and the base to a spacer; and
    wherein the piezoelectric crystal is bonded to the base by conductive adhesive.

14. The method of claim 13, wherein cutting the notch includes the notch extending through the base from the upper surface to the lower surface.

15. The method of claim 13, wherein the notch is a first notch, further comprising cutting a second notch into at least one of an upper surface or a lower surface of a base of the vibration sensor.

16. A vibration sensor comprising:
    a first piezoelectric crystal;
    a second piezoelectric crystal;

a base having an upper surface and a lower surface that each extend to a common outer edge of the base defining an outer diameter of the base, the base attached to the first piezoelectric crystal on a first side of the base and attached to the second piezoelectric crystal on a second side of the base opposite the first side of the base, the base having an outer diameter being smaller than the outer diameter of at least one of the first or second piezoelectric crystal;

wherein the first piezoelectric crystal and second piezoelectric crystal are attached to the base by conductive adhesive;

a fastener extending through a hole defined in the first piezoelectric crystal, a hole defined in the second piezoelectric crystal, and a hole defined in the base; and a spacer, the fastener attaching the first piezoelectric crystal, the second piezoelectric crystal, and the base to the spacer;

a voltage amplifier in electrical communication with the first piezoelectric crystal;

a charge amplifier in electrical communication with the second piezoelectric crystal;

a summing circuit in electrical communication with the voltage amplifier and the charge amplifier, and producing a vibration output that is proportional to vibration and independent of temperature; and a divider circuit separate from the summing circuit in electrical communication with the voltage amplifier and the charge amplifier, and producing a temperature output that is proportional to temperature and independent of vibration.

* * * * *